United States Patent [19]

Hiramatu

[11] Patent Number: 4,633,081
[45] Date of Patent: Dec. 30, 1986

[54] PHOTOELECTRIC SWITCH
[75] Inventor: Hirosi Hiramatu, Osaka, Japan
[73] Assignee: Hokuyo Automatic Co., Ltd., Osaka, Japan
[21] Appl. No.: 672,221
[22] Filed: Nov. 16, 1984
[30] Foreign Application Priority Data
Nov. 18, 1983 [JP] Japan .................. 58-179033[U]
[51] Int. Cl.$^4$ .............................................. H01J 5/02
[52] U.S. Cl. ...................................... 250/239; 362/368
[58] Field of Search ............ 250/221, 239, 362; 362/368, 444, 455, 800

[56] References Cited
FOREIGN PATENT DOCUMENTS
995569 6/1965 United Kingdom ................ 250/239

Primary Examiner—Gene Wan
Attorney, Agent, or Firm—Armstrong, Nikaido, Marmelstein & Kubovcik

[57] ABSTRACT

In a photoelectric switch comprises a light projecting part, a light receiving part and a control part for controlling these parts. The light projecting part and the light receiving part are fixed in mounting holes in the following manner. The light projecting part and the light receiving part further comprises a cylindrical holder having a flange at one end, a circular truncated cone-type hook sliding on the holder and having a variable diameter, and a spring for pressing this hook toward the flange of the holder. The holder of the light projecting part or the light receiving part is inserted into the mounting hole. With use of a suitable tool, the hook is separated from the flange and the diameter of the large diameter part is momentarily reduced. The hook is penetrated through the mounting hole, and the peripheral part of the mounting hole is held between the large diameter part of the expanded hook and the flange.

14 Claims, 18 Drawing Figures

//4,633,081

PHOTOELECTRIC SWITCH

BACKGROUND OF THE INVENTION

This invention relates to a photoelectric switch structure for mounting and fixing the light projecting part and the light receiving part of a photoelectric switch into a hole which is perforated in a planar or hollow cylindrical support.

In a typical example of the photoelectric switch which detects the presence of a man or a body, a light projecting part 1a and a light receiving part 1b are separated from a control part of the photoelectric switch 2 and connected with a lead wire 3 as shown in FIG. 1. A photoelectric switch of this type is used as a safety switch, as shown in FIGS. 2 and 3 where the light projecting part 1a and the light receiving part 1b are mounted on the supports 5a and 5b, respectively, of an automatic door 4 so as to be facing to each other. Interception of the light projected from the light projecting part 1a to the light receiving part 1b is detected so that it is confirmed that neither a person nor a material is near the door, before the door is closed.

The ability to mount the above-mentioned light projecting part 1a and the light receiving part 1b is limited by the fact that the door supports 5a and 5b cannot be manipulated from the rear side and that the thickness of the door supports 5a and 5b are different for each use.

Therefore, the light projecting element 1a' or the light receiving element 1b' has been built in a cylindrical holder 6 shown in FIG. 4, constituting the light projecting part 1a or the light receiving part 1b. The cylindrical part 6b of the holder 6 is inserted into a mounting hole 7 which is provided in the door supports 5a and 5b. The light projecting part 1a and the light receiving part 1b are fixed to the door supports 5a and 5b by screws 8,8 through holes 6c,6c perforated in a flange 6a.

However, because the above mounting structure requires the formation of screw holes 9,9 in the door supports 5a and 5b and the screw-down operation, the mounting work becomes troublesome. Furthermore, the flange 6a has a diameter much larger than that of a lens which is far from the light projecting part 1a or the light receiving part 1b. The exposed state of the flange and the heads 8',8' of mounting screws 8,8 disturbs the outside view.

SUMMARY OF THE INVENTION

This invention is intended to eliminate such defects in the prior art. An object of the invention is to provide a simple and quick method of fixing the light projecting part and the light receiving part of a photoelectric switch in the hole of a support, thereby facilitating the mounting operation and providing a neat appearance of mounting.

According to this invention, the light projecting or receiving part is mounted and fixed in a mounting hole, separated from the control part of the photoelectric switch. The characteristic of this invention is as follows. The light projecting part or the light receiving part is provided with a holder which has a flange with a perforation at one end of a cylinder containing a light projecting element or a light receiving element. A hook has a variable larger diameter part extending like a petal from one end of an annular base of a smaller diameter and the larger diameter part is opposed to the flange and the hook is slidably fitted on the outer periphery of the cylinder. The light projecting or receiving part is equipped with the hook and an elastic material which forces the hook toward the flange side. The light projecting or receiving part is inserted into the mounting hole from the cylinder side of the holder. The hook is pressed by a bar and passes through the perforation which separates the hook from the flange and decreases the diameter of the larger diameter part momentarily. After the hook is passed through the perforation, the diameter of the larger diameter part is expanded so that the peripheral part of the mounting hole is held between the hook and the flange. The mounting of the light projecting or receiving part is finished.

This invention makes it possible to mount and fix the light projecting or receiving part of a photoelectric switch into the mounting hole of door supports through a simple and quick operation by pressing a metal fitting of a simple shape. Neither screw-down work nor the work of forming screw holes in the neighborhood of the mounting hole is needed. Therefore, the mounting operation becomes extremely simple. Furthermore, since screw holes need not be formed in the flange of the light projecting or receiving part, the diameter of the flange can be made small. Since the screw heads are not exposed, the shape of outside view after mounting is simple and neat.

DESCRIPTION OF THE DRAWINGS

The present invention will be apparent from the following detailed description taken in conjunction with accompanying drawings, in which:

FIGS. 7a to 7d show a holder of the light projecting or receiving part in which FIG. 7a is a left side view, FIG. 7b is a left side view, FIG. 7b a cross-sectional view along the line VIIb—VIIb, FIG. 7c a right side view, and FIG. 7d a bottom view;

FIGS. 9a and 9b show a hook of the light projecting or receiving part in which FIG. 9a is a left side view and FIG. 9b a cross-sectional view along the line IXb—IXb;

DETAILED DESCRIPTION

One embodiment of this invention is now explained with reference to FIGS. 5 to 14.

Figure 1:
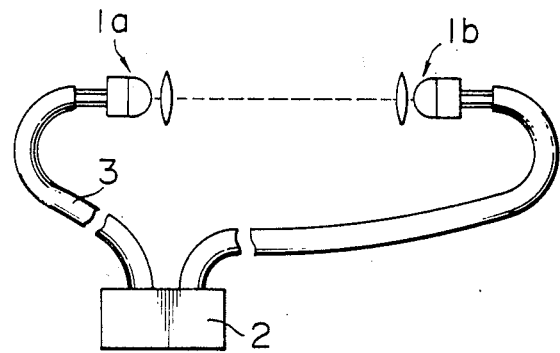
FIG. 1 is a schematic diagram of a photoelectric switch of the prior art where the light projecting part and the light receiving part are separated from each other.
Figure 2:
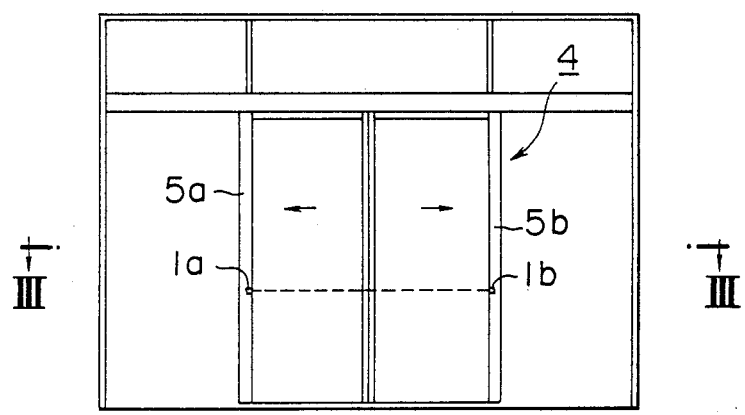
FIG. 2 is a front view of an automatic door where the photoelectric switch of FIG. 1 is applied.
Figure 3:
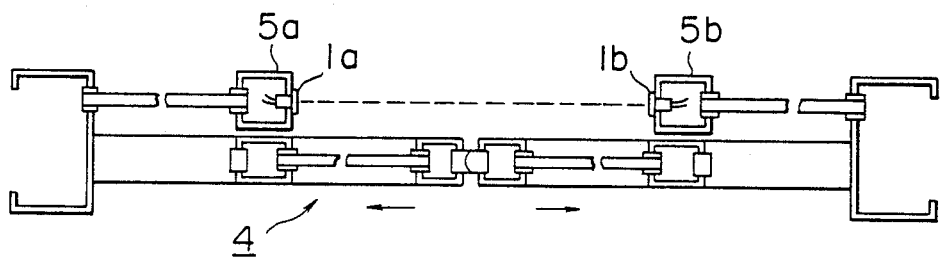
FIG. 3 is an enlarged cross-sectional view along the line III—III of FIG. 2.
Figure 4:
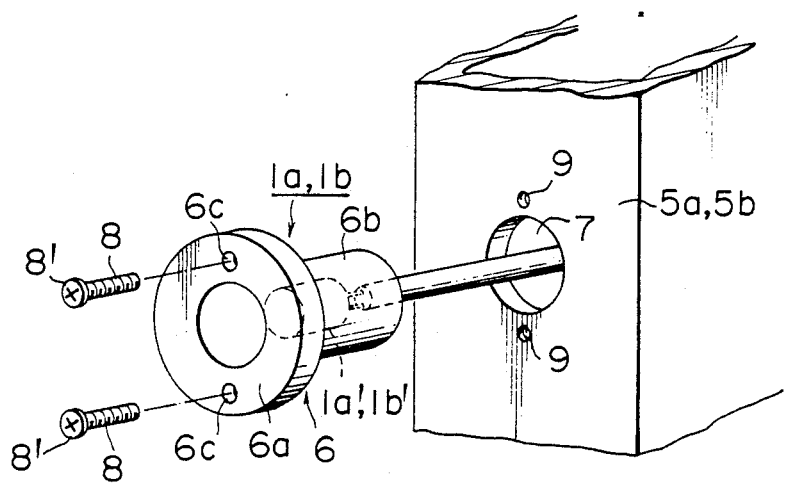
FIG. 4 is a perspective view showing the mounting structure of the prior art of the light projecting part or the light receiving part.
Figure 5:
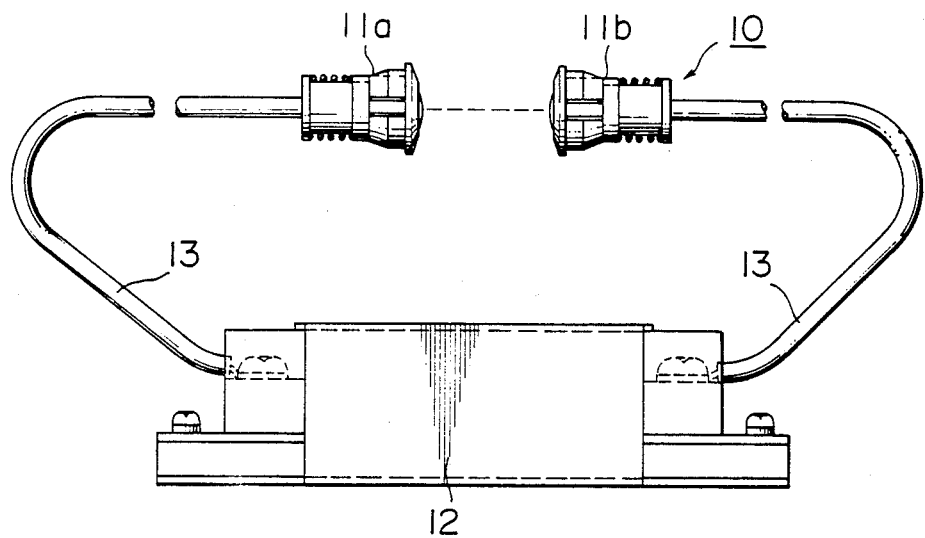
FIG. 5 is a top view showing the whole structure of a photoelectirc switch according to this invention.

FIG. 5 shows an overall external view of a photoelectric switch 10, which consists of a light projecting part 11a, a light receiving part 11b, a control part of photoelectric switch 12, and electric wires 13,13 which connect these components. An enlarged view of the inventive light projecting part 11a or light receiving part 11b is as shown in FIG. 6.

Figure 6:
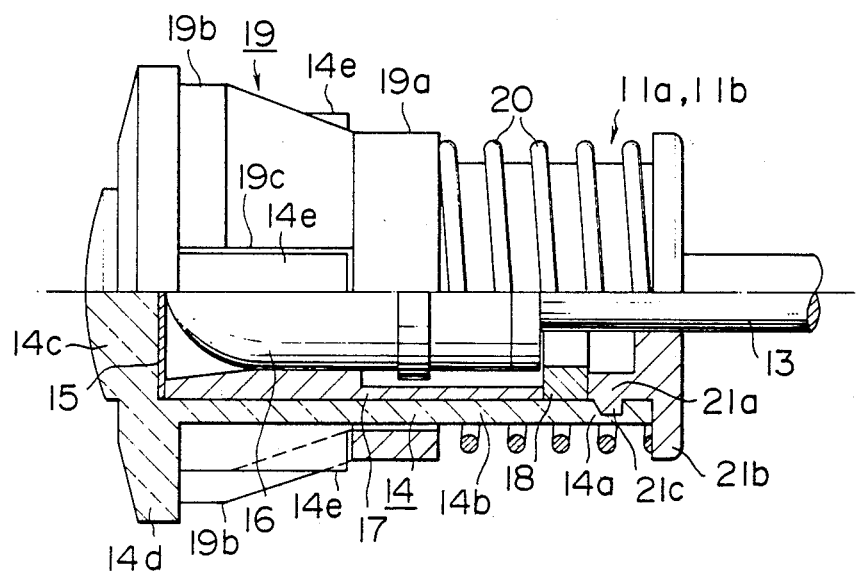
FIG. 6 is a semi-cross-section of an enlarged view of the light projecting part or the light receiving part of a photoelectric switch according to this invention.
Figure 7A:
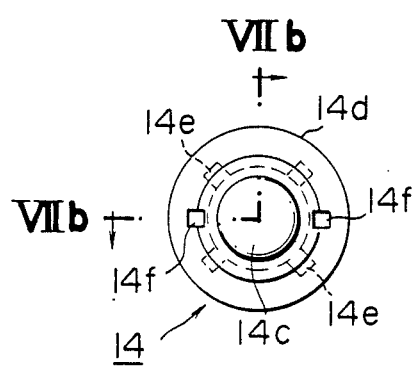
Figure 7B:
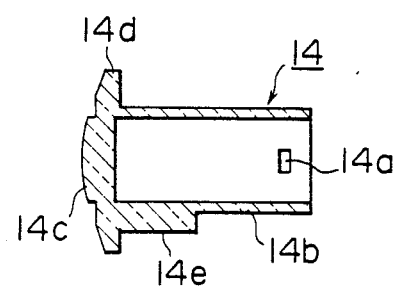
Figure 7C:
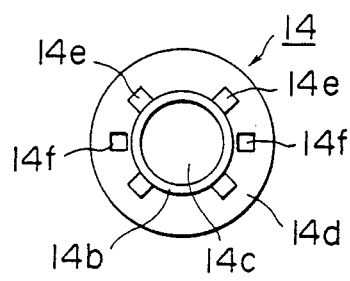
Figure 7D:
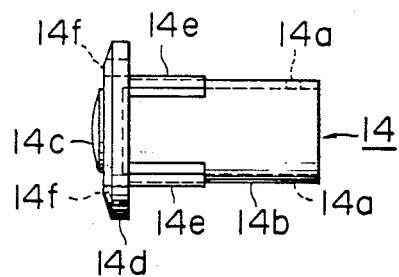
Figure 8:
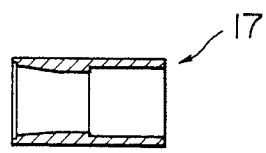
FIG. 8 is a cross-sectional view of a sleeve of the light projecting or receiving part.
Figure 9A:
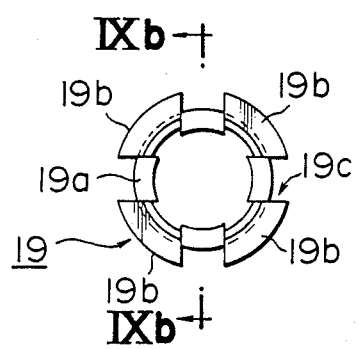
Figure 9B:
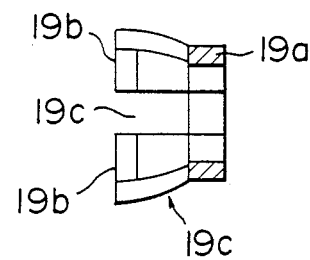
Figure 10:
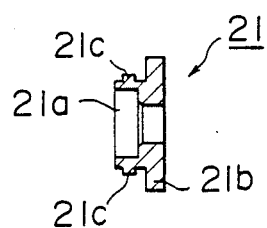
FIG. 10 is a cross-sectional view of a cover part.

In FIG. 6, 14 denotes a holder. As shown in FIGS. 7a to 7d, a lens 14c is formed to cover the one end of a cylinder 14b which has two stopping holes 14a, 14a on the other end. A flange 14d is formed and extended from the periphery of the lens 14c. On the outer periphery of the cylinder 14b of the holder 14 on the flange side, square column projections 14e, 14e, 14e, 14e are formed at intervals of 90° along the flange 14d. Holes 14f,14f are perforated in the flange 14d at opposite ends of a diameter of the flange so that the outer periphery of the cylinder 14b can be seen. Numeral 15 denotes an infrared light transmission filter placed on the bottom of the holder 14 in contact with the lens surface, 16 is a light projecting or receiving element constituting an infrared light emitting LED or a phototransistor, 17 is a cylindrical sleeve of a shape as shown in FIG. 8 which has the light projecting or receiving element inserted and held therein is inserted into the holder 14, and 18 is an annular spacer of rubber. Numeral 19 denotes a hook of flexible material, for example, polyacetal such as Delrim (Trade Mark) which is slidably fitted on the outer periphery of the cylinder 14b. Petal extensions 19b,19b, 19b,19b are provided at intervals of 90° at the one end of an annular base 19a to form a large diameter part 19c. The square-column projections 14e,14e,14e,14e on the outer periphery of the holder are inserted between the extensions 19b,19b,19b,19b. Numeral 20 denotes a compressed spring of elastic material mounted on the outer periphery of the cylinder 14b of the holder 14. Numeral 21 is a cover for closing the end of the aperture of the holder 14 and having a cylindrical part 21a and a disk part 21b connected with the cylindrical parts 21a. Two stopping projections 21c provided on the cylindrical part 21a are engaged with stopping holes 14a. In this way, the sleeve 17 which holds the light projecting or receiving element 16 is pressed and fixed into the holder 14 through the ring spacer 18. Furthermore, on the outer periphery of the cylindrical part 14b of the holder, the elastic member is held by the annular base 19a of the hook 19.

The light projecting part 11a and the light receiving part 11b with the above-mentioned structure are mounted in the mounting holes of door supports, etc. as follows.

Figure 11:
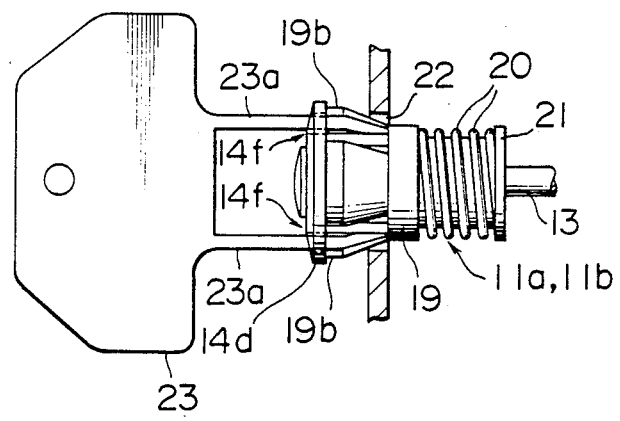
FIGS. 11 to 14 are cross-sectional views for explaining the mounting operation in sequence of the light projecting or receiving part of this invention.
Figure 12:
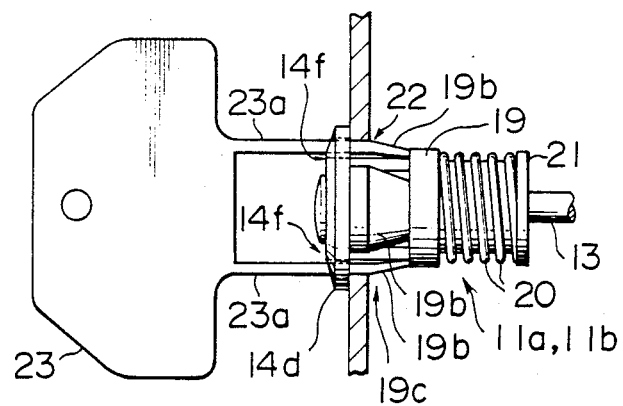
Figure 13:
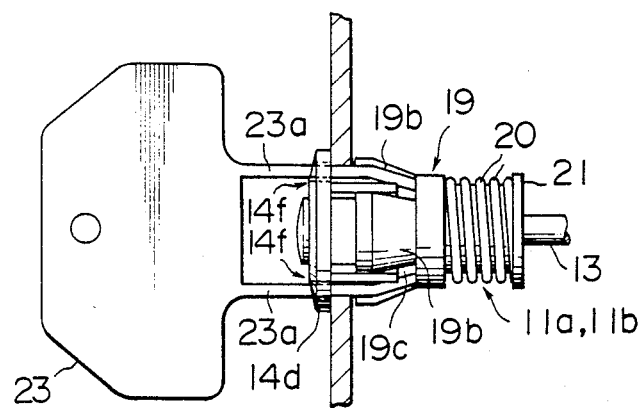
Figure 14:
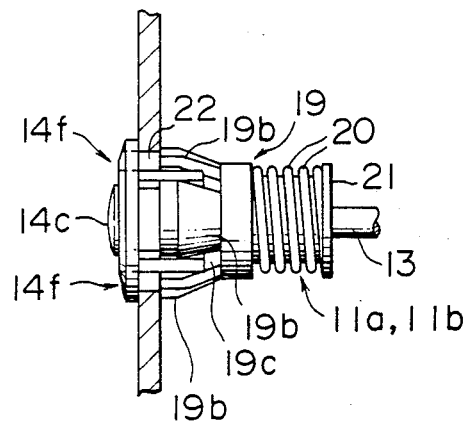

First, as shown in FIG. 11, the light projecting part 11a or the light receiving part 11b is inserted into the mounting hole 22 of the door supports from the side of the cover 21. Prior to this, the electric wire 13 is inserted. Then, two parallel bars 23a on the top of a metal fitting 23 are inserted into two perforated holes 14f of the flange 14d. Under this condition, when the metal fitting 23 is pressed strongly toward the mounting hole 22, the tips of the bars 23a are caused to contact with the edges of the petal extentions 19b. In this manner, the light projecting part 11a or the light receiving part 11b is deeply inserted and fixed into the mounting hole 22, as shown in FIG. 12. In this state, the large diameter part 19c having the petal extensions 19b reduces its diameter as it is pressed into the mounting hole 22. When the metal fitting 23 is further pressed, the flange 14d of the holder 14 is stopped at the edge part of the mounting hole 22. The hook 19, pressing the elastic member 20 and sliding on the outer periphery of the cylindrical part 14b of the holder, is forced deeply into the inner part. In this state, the large diameter petal part 19c of the hook is released from the mounting hole 22 and expanded. Then, the metal fitting 23 is drawn out of the holes 14f,14f of the flange 14d. The hook 19 is pushed back by the elastic member 20, as shown in FIG. 14. The large diameter petal part 19c and the flange 14d hold the peripheral part of the mounting hole 22 therebetween. Thus, the light projecting part 11a or the light receiving part 11b is mounted and fixed in the mounting hole 22.

We claim:

1. A photoelectric switch comprising:
   a photoelectric means for producing a light path, said photoelectric means includes
      light projector means having a light projecting element, and
      light receiver means having a light receiving element for receiving the light emitted from said light projector means;
   control unit for energizing said photoelectric means to detect the interruption of said light path established between said light projector means and said light receiver means; and
   mounting means for mounting one of said light projector and light receiver means, each said mounting means including
      holder means for holding said element inside said holder means, said holder means includes a front end and a back end,
      hook means disposed on the outside of said holder means in a slideable fashion, said hook means includes a first end which has an annular base, and a second end which has a variable large diameter part, wherein said annular base of said first end has a diameter smaller than said variable large diameter part of said second end, and
      spring means for pressing said hook means on said holder means toward said front end of said holder means.

2. A photoelectric switch according to claim 1, wherein said holder means of said photoelectric means comprises a cylindrical part containing said photoelectric means and a flange provided at said first end of said cylindrical part.

3. A photoelectric switch according to claim 2, wherein said cylindrical part has a plurality of stopping holes provided on said second end thereof.

4. A photoelectric switch according to claim 3, wherein said cylindrical part has a cover closing the aperture end of said cylindrical part and said cover has a plurality of stopping projectors engaged with said stopping holes.

5. A photoelectric switch according to claim 2, wherein said cylindrical part comprises a sleeve engaged with the inner surface thereof and holding said photoelectric means.

6. A photoelectric switch according to claim 5, wherein a filter is provided at the front end of said sleeve.

7. A photoelectric switch according to claim 2, wherein said cylindrical part comprises a plurality of square-column projections extending from said flange on the outer periphery of said cylindrical part and disposed at predetermined angular intervals.

8. A photoelectric switch according to claim 7, wherein said square-column projections are provided at intervals of 90°.

9. A photoelectric switch according to claim 2, wherein said flange has a plurality of diametrically opposed perforated holes provided on said flange on the outer peripheral surface of said cylindrical part.

10. A photoelectric switch according to claim 2, wherein said flange is formed in one united body with said cylindrical part at said first end thereof to form the closed end part of said cylindrical part.

11. A photoelectric switch according to claim 10, wherein a lens having nearly the same diameter as the inner diameter of said cylindrical part is formed at the center part of said flange.

12. A photoelectric switch according to claim 1, wherein said hook means of said mounting means is made of a flexible material such as polyacetal.

13. A photoelectric switch according to claim 1, wherein the varible large diameter part of said hook means comprises a plurality of extensions disposed like petals at a predetermined angular interval at one end of said annular base.

14. A photoelectric switch according to claim 13, wherein said extensions are disposed at an interval of 90°.

* * * * *